United States Patent [19]
Plunkett

[11] Patent Number: 5,988,650
[45] Date of Patent: Nov. 23, 1999

[54] MULTI-LAYERED CYLINDER HEAD GASKET WITH COMPENSATING INTERMEDIATE PLATE

[75] Inventor: Thomas P. Plunkett, Bolingbrook, Ill.

[73] Assignee: Dana Corporation, Toledo, Ohio

[21] Appl. No.: 08/898,002

[22] Filed: Jul. 25, 1997

[51] Int. Cl.⁶ .................................................. F16J 15/08
[52] U.S. Cl. .......................................... 277/593; 277/595
[58] Field of Search .................................... 277/591, 593, 277/594, 595, 597, 601

[56] References Cited

U.S. PATENT DOCUMENTS

| | | |
|---|---|---|
| 4,196,913 | 4/1980 | Oka . |
| 4,796,897 | 1/1989 | Inciong . |
| 4,799,695 | 1/1989 | Yoshino . |
| 4,836,562 | 6/1989 | Yoshino ................................. 277/595 |
| 4,995,624 | 2/1991 | Udagawa et al. ...................... 277/595 |
| 5,110,630 | 5/1992 | Abe et al. . |
| 5,130,203 | 7/1992 | Abe et al. . |
| 5,169,163 | 12/1992 | Udagawa et al. . |
| 5,209,504 | 5/1993 | Udagawa et al. ...................... 277/595 |
| 5,213,345 | 5/1993 | Udagawa ............................... 277/595 |
| 5,215,316 | 6/1993 | Udagawa ............................... 277/595 |
| 5,267,740 | 12/1993 | Stritzke . |
| 5,277,434 | 1/1994 | Kestly et al. . |
| 5,286,039 | 2/1994 | Kawaguchi et al. ................ 277/595 X |
| 5,294,135 | 3/1994 | Kubouchi et al. . |
| 5,490,681 | 2/1996 | Plunkett et al. . |
| 5,522,604 | 6/1996 | Weiss et al. ........................... 277/594 |
| 5,582,415 | 12/1996 | Yoshida et al. .................... 277/595 X |
| 5,588,657 | 12/1996 | Fujisawa et al. .................. 277/595 X |
| 5,628,113 | 5/1997 | Tanaka et al. ..................... 277/595 X |
| 5,700,016 | 12/1997 | Miyaoh et al. ........................ 277/591 |

FOREIGN PATENT DOCUMENTS

| | | |
|---|---|---|
| 0230804 | 6/1980 | European Pat. Off. . |
| 63-246571 | 10/1988 | Japan . |

OTHER PUBLICATIONS

Rick Capretta and Hirotaka Ohigashi, Design Methodology for Automotive Multi–Layer Steel Steel Cylinder Head Gaskets, 1995, SAE Technical Paper Series 950322.

*Primary Examiner*—Chuck Y. Mah
*Assistant Examiner*—Alison K. Pickard
*Attorney, Agent, or Firm*—Rader, Fishman & Grauer PLLC

[57] ABSTRACT

An inventive multi-layered cylinder head gasket includes a metallic base plate with an inner peripheral edge spaced radially outwardly from a cylinder bore opening and a metallic compensating plate thicker than the base plate. The base plate includes a stopper section comprising an integral flange folded about an inner peripheral edge of the compensating plate and terminating at a free edge adjacent the inner peripheral edge of the base plate.

18 Claims, 2 Drawing Sheets

MULTI-LAYERED CYLINDER HEAD GASKET WITH COMPENSATING INTERMEDIATE PLATE

FIELD OF THE INVENTION

The present invention relates to improvements in multi-layered gaskets and more particularly to the use of a compensating intermediate plate thicker than adjacent base plates, a radial end of one of the base plates adjacent a folded over portion of the intermediate plate.

BACKGROUND OF THE INVENTION

Gaskets are often used as a seal between mating mechanical components. One common application involves gasket placement between the engine block and cylinder head of an internal combustion engine. Cylinder head gaskets typically extend around cylinder bores to provide a combustion seal, maintaining the high temperature gases of combustion within the cylinder bores. Simultaneously, the gaskets also seal fluid flow openings such as coolant and oil openings to prevent undesirable mixing. A cylinder head gasket bears the load from a bolted connection of the mechanical components and relies upon that load to provide both the combustion and fluid flow seals.

In a metal laminate gasket for an internal combustion engine, the gasket is formed from a plurality of metal plates laminated together. The metal layers provide a seal for the engine coolant and lubricant. The metal layers also provide structural support within the joint between the cylinder head and the block, and provide radial strength to resist blow-out of the gasket due to pressure from the combustion chamber.

To provide adequate gasket thickness, it is known to use at least one thin metal intermediate plate that extends across the entire gasket. It is also known to have a thin compensating plate that provides a differential gasket thickness between the combustion and fluid flow seals. Often the compensating plate is folded upon itself or the intermediate plate to provide the differential gasket thickness.

It is also known to have a base plate adjacent a compensating plate, wherein an end of the base plate is radially spaced outwardly from an end of the compensating plate. A distinct secondary material is laminated onto the compensating plate to help provide a combustion seal.

SUMMARY OF THE INVENTION

The present invention is directed to a multi-layered metallic cylinder head gasket for use in an internal combustion engine having at least one cylinder bore opening and at least one fluid flow opening. The gasket includes at least one metallic base plate with an inner peripheral edge spaced radially outwardly from the cylinder bore opening. A metallic compensating plate substantially parallel to and thicker than the metallic base plate is placed in facing contact with the base plate. The compensating plate has two faces and an inner peripheral edge defining a portion of the cylinder bore opening. An integral flange is folded about the inner peripheral edge of the compensating plate and terminates at a free edge spaced radially outwardly from the inner peripheral edge to form a stopper section which acts as the primary combustion seal for the gasket. The free edge of the flange is adjacent the inner peripheral edge of the base plate and helps to maintain the base plate in position. The extra thickness of the compensating plate helps to ensure that an increased percentage of the total clamping load applied to the gasket is focused about the combustion bore opening.

The stopper section may comprise a step adjacent the free edge of the flange to offset the stopper section longitudinally from the base plate, which may be desirable when the base plate includes a bead which helps to provide a secondary combustion seal.

In a preferred embodiment the gasket includes a second metallic base plate parallel to the first base plate and in facing contact with the opposing face of the compensating plate. The inner peripheral edge of the second base plate helps to define a portion of the cylinder bore opening and a portion of the primary combustion seal. If the second plate includes a bead, it is preferred that the beads are radially aligned with one another and extend in an opposing longitudinal direction and share a common longitudinal extent.

The invention provides a number of advantages. In particular, by minimizing the number of components which form the combustion bore opening, tolerance stack up problems are addressed. Further, the gasket may be easily customized for different applications. Material costs are also reduced.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
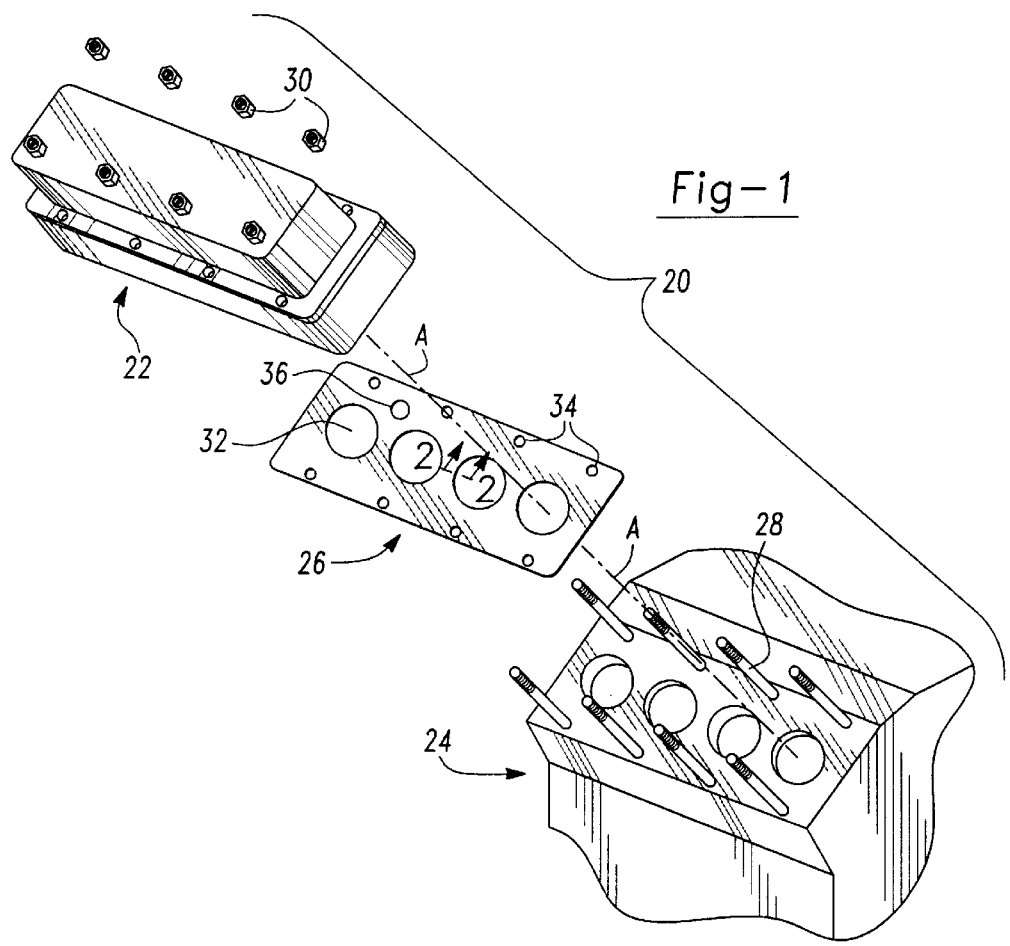
FIG. 1 is a perspective view of a cylinder head gasket disposed between a cylinder head and engine block of an internal combustion engine by means of threaded fasteners.

A cylinder head gasket assembly 20 illustrated in FIG. 1 includes a cylinder head 22, an engine block 24, a multi-layered metallic gasket 26, bolts 28, and nuts 30. Gasket 26 includes generally annular cylinder bore openings 32 extending about a longitudinal axis A—A, pilot holes 34 for bolts 28, and fluid flow openings 36. When assembly 20 is installed, gasket 26 provides a combustion seal around cylinder bore openings 32 and a fluid flow seal around fluid flow openings 36.

Figure 2:
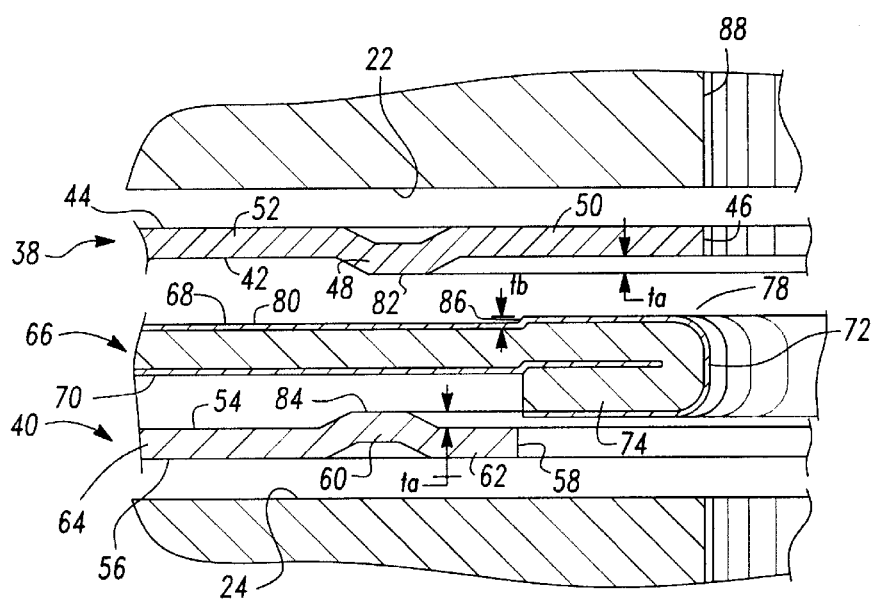
FIG. 2 is an exploded cross-sectional view of the gasket before installation disposed between the cylinder head and engine block taken along lines 2—2 in FIG. 1.

An exploded partial cross-sectional view of gasket 26 positioned between cylinder head 22 and engine block 24 is shown in FIG. 2. Gasket 26 includes two metallic base plates 38, 40. Plates 38 and 40 are substantially parallel to one another and extend along a common radial axis defined therebetween perpendicular to longitudinal axis A. Plate 38 has an inner face 42, an outer face 44, and an inner peripheral edge 46 defining a portion of cylinder bore opening 32. Base plate 38 includes at least one bead 48 spaced radially outwardly from peripheral edge 46. A generally flat portion 50 is defined between bead 48 and peripheral edge 46 and a generally flat portion 52 is defined radially outwardly of bead 48. Base plate 40 has an inner face 54, an outer face 56, and an inner peripheral edge 58 spaced radially outwardly from cylinder bore opening 32. Base plate 40 includes at least one bead 60 spaced radially outwardly from peripheral edge 58. A generally flat portion 62 is defined between bead 60 and peripheral edge 58 and a generally flat portion 64 is defined radially outwardly of bead 60.

Inner faces 42 and 54 are in facing relation to one another with beads 48 and 60 radially aligned with each other. Beads 48 and 60 have a common longitudinal extent $t_a$ with respect to their respective flat portions 50,52 and 62,64.

Base plates 38 and 40 are preferably made from a high temper stainless steel. The thickness of plates 38 and 40 are typically approximately 0.20 mm.

A metallic compensating and intermediate plate 66 is interposed between plates 38 and 40. Plate 66 is substantially parallel to the base plates and includes a first face 68 and a second face 70. Plate 66 has an inner peripheral edge 72 which defines a portion of the cylinder bore opening 32. An integral flange 74 is folded about edge 72 and terminates at a free edge 76 spaced radially outwardly from edge 72 to form a stopper section 78 comprising a double thickness of plate 66 adjacent edge 72. Flange 74 is in facing relation to face 70.

Plate 66 acts as both an intermediate plate and a compensating plate. It is made from a low carbon steel and may include zinc plating 80. Plate 66 is substantially thicker than both base plates 38 and 40. Preferably, it is approximately half again as thick as either base plate and more preferably, plate 66 is approximately 0.30 mm thick.

Base plate 38 is in facing relation to face 68 of plate 66 while base plate 40 is in facing relation to face 70 of plate 66. Flange 74 is sized such that its free edge 76 is closely adjacent inner peripheral edge 58 of base plate 40.

Before installation beads 48 and 60, which include apexes 82 and 84, respectively, are positioned adjacent to plate 66 while the respective flat portions 50,52 and 62,64 of plates 38 and 40 are generally spaced from plate 66 by $t_a$. However, plate 66 may include a step 86 adjacent both free edge 76 and inner peripheral edge 58 which offsets stopper section 78 longitudinally by $t_b$. In a preferred embodiment, $t_b$ is approximately 0.05 mm.

Figure 3:
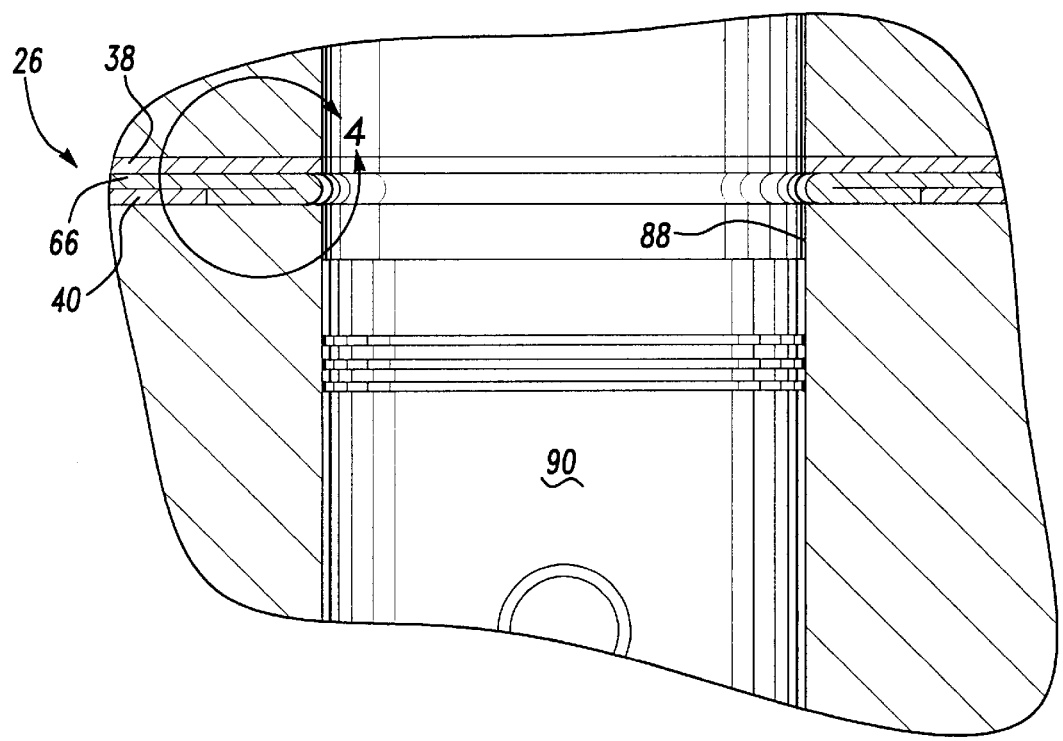
FIG. 3 shows the gasket in an installed orientation adjacent the combustion opening of a cylinder with piston.
Figure 4:
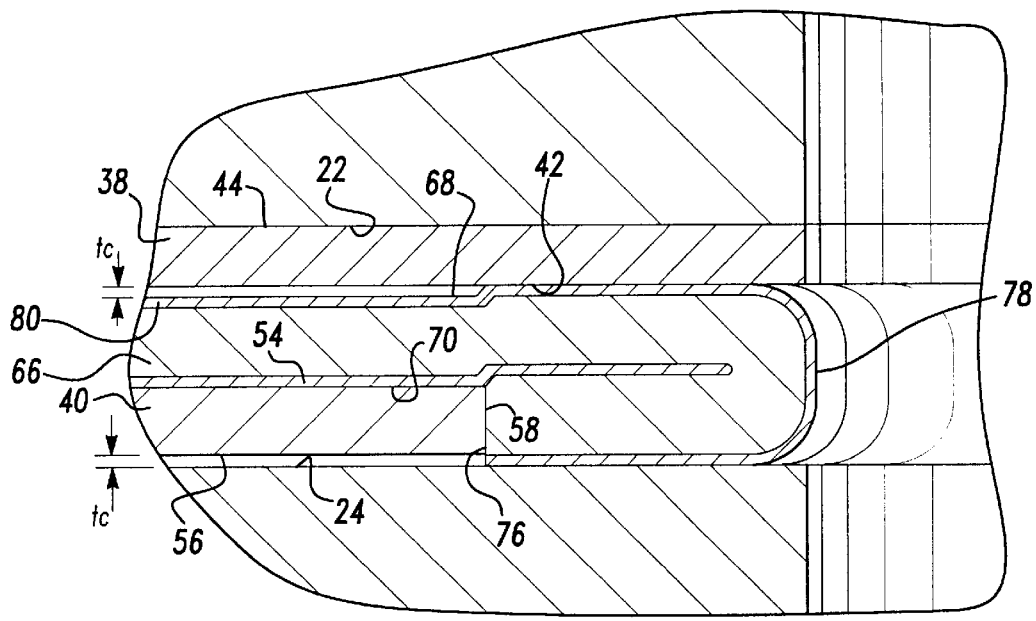
FIG. 4 is an enlarged cross-sectional view of the gasket as shown by encircled region 4 in FIG. 3.

Step 86 helps to insure equal compression of beads 48 and 60 when gasket 26 is installed as illustrated in FIGS. 3 and 4. Gasket 26, through the use of base plate 38 and stopper section 78 of compensating plate 66 acts as a primary combustion seal against the high temperature gases of combustion formed in combustion bore 88 as piston 90 moves up and down the bore in response to the ignition of combustion gases. Stopper section 78, formed from the thicker compensating plate 66, helps to ensure a robust combustion seal about combustion bore opening 32. A gap $t_c$ exists between outer face 56 of plate 40 and engine block 24, and between outer face 68 of plate 66 and inner face 42 of plate 38, allowing a greater share of the load provided by bolts 28 and nuts 30 to be concentrated about bore 88. Beads 48 and 60 act as a secondary combustion seal and prevent fluid migration to stopper 78. Standard elastomeric coatings may be selectively applied to each of the plates to insure sealing over and between them.

Gasket 26 provides a number of significant advantages. As noted above, a single plate 66 combines a spacer layer provided by an intermediate plate and a stopper layer provided by a compensating plate into one layer. The use of plate 66 in combination with having inner peripheral edge of base plate 40 offset from stopper section 78 minimizes the number of components which form the combustion bore opening and primary combustion seal. Thus, tolerance stack up problems which are caused by having disparate components are minimized. Yet, the close relationship between inner peripheral edge 58 of plate 40 and free end 76 of flange 74 helps to prevent undesirable shifting of plate 40. Plate 66 is easily modified for different gasket designs, reducing gasket modification costs. Gasket cost is also reduced through the use of a compensating plate made from a low carbon steel as compared to prior art compensating plates which are typically stainless steel.

The disclosed embodiments and examples are given to illustrate the present invention. However, they are not meant to limit the scope and spirit of the present invention. Therefore, the present invention should be limited only by the appended claims.

What is claimed is:

1. A cylinder head gasket of an internal combustion engine having at least one cylinder bore opening and at least one fluid flow opening, the cylinder head gasket comprising:

at least one metallic base plate with an inner peripheral edge spaced radially outwardly from said cylinder bore opening; and a metallic compensating plate substantially parallel to and thicker than said metallic base plate, said compensating plate having first and second faces and an inner peripheral edge defining a portion of said cylinder bore opening, an integral flange defined by an edge of said compensating plate being folded back onto itself about said inner peripheral edge of said compensating plate and terminating at a free edge spaced radially outwardly from said inner peripheral edge of said compensating plate to form a stopper section in facing relation to said second face, said metallic base plate in facing relation to said second face, said inner peripheral edge of said metallic base plate adjacent said free edge of said flange; and wherein a longitudinal axis is defined as being perpendicular to the the gasket and said stopper section comprises a step adjacent said free edge of said flange to offset said stopper section longitudinally away from said base plate.

2. A gasket as recited in claim 1, wherein said base plate includes a bead spaced radially outwardly from said inner peripheral edge of said base plate.

3. A gasket as recited in claim 2, wherein said bead includes an apex in facial contact with said second face of said compensating plate.

4. A gasket as recited in claim 1, wherein said gasket further comprises a second metallic base plate substantially parallel to said first base plate and in facing relationship to said first face of said compensating plate, an inner peripheral edge of said second base plate defining a portion of the cylinder bore opening.

5. A gasket as recited in claim 4, wherein at least one of said base plates includes a bead spaced radially outwardly from said free edge of said flange.

6. A gasket as recited in claim 4, wherein each of said base plates have a bead, said beads being radially aligned with one another.

7. A gasket as recited in claim 6, wherein said beads extend in opposing longitudinal directions and have a common longitudinal axis.

8. A gasket as recited in claim 1, wherein said compensating plate is approximately half again as thick as said base plate.

9. A gasket as recited in claim 1, wherein said compensating plate is low carbon steel and said at least one base plate is stainless steel.

10. A cylinder head gasket of an internal combustion engine having at least one cylinder bore opening and at least one fluid flow opening, the cylinder head gasket comprising:

first and second metallic base plates substantially parallel to one another and extending along a common radial axis defined therebetween, each of said base plates having an inner face and an outer face, said inner faces being in facing relation to one another, said first metallic base plate having an inner peripheral edge spaced radially outwardly from said cylinder bore opening and said second metallic base plate having an inner peripheral edge defining a portion of said cylinder bore opening;

a metallic compensating plate substantially parallel to and interposed between said first and second base plates, said compensating plate having first and second faces and an inner peripheral edge defining a portion of said cylinder bore opening, an integral flange folded about said inner peripheral edge of said compensating plate and terminating at a free edge spaced radially outwardly from said inner peripheral edge of said compensating plate to form a stopper section in facing relation to said second face, wherein said first base plate is in facing relation to said second face and said inner peripheral edge of said first base plate is located radially outwardly from said cylinder bore opening, adjacent said free edge of said flange.

11. A gasket as recited in claim 10, wherein said compensating plate is thicker than said first base plate.

12. A gasket as recited in claim 11, wherein said base plates have a common thickness.

13. A gasket as recited in claim 12, wherein said compensating plate is approximately half again as thick as said base plates.

14. A gasket as recited in claim 13, wherein each of said base plates have at least one bead, said beads being radially aligned with one another.

15. A gasket as recited in claim 14, wherein said beads extend in opposing longitudinal directions and have a common longitudinal axis.

16. A gasket as recited in claim 15, wherein said compensating plate includes a step adjacent said inner peripheral edge of said first base plate to offset said stopper section longitudinally away from said base plate.

17. A cylinder head gasket of an internal combustion engine having at least one cylinder bore opening and at least one fluid flow opening, the cylinder head gasket comprising:

first and second metallic base plates of common thickness substantially parallel to one another and extending along a common radial axis defined therebetween, each of said base plates having an inner face and an outer face, each of said base plates having at least one bead radially aligned with one another and sharing a common longitudinal axis, said inner faces being in facing relation to one another, said first metallic base plate having an inner peripheral edge spaced radially outwardly from said cylinder bore opening and said second metallic base plate having an inner peripheral edge defining a portion of said cylinder bore opening;

a metallic compensating plate approximately half again as thick as said base plates substantially parallel to and interposed between said base plates, said compensating plate having first and second faces and an inner peripheral edge defining a portion of said cylinder bore opening, an integral flange folded about said inner peripheral edge of said compensating plate and terminating at a free edge spaced radially outwardly from said inner peripheral edge to form a stopper section in facing relation to said second face, wherein said first base plate is in facing relation to said second face and said inner peripheral edge of said first base plate is adjacent said free edge of said flange; and wherein a longitudinal axis is defined as being perpendicular to the the gasket and said stopper section comprises a step adjacent said free edge of said flange to offset said stopper section longitudinally away from said first base plate.

18. A gasket as recited in claim 17, wherein said base plates are approximately 0.20 mm thick, said compensating plate is approximately 0.3 mm thick and said step is approximately 0.05 mm.

* * * * *